Patented July 7, 1953

2,644,843

UNITED STATES PATENT OFFICE 2,644,843

METHOD OF ALKYLATION OF ARYLMETHYL METHYL KETONES

Frank S. Crossley, Collingdale, Pa., assignor to Merck & Co., Inc., Rahway, N. J., a corporation of New Jersey No Drawing. Application December 30, 1949, Serial No. 136,177

8 Claims. (Cl. 260—590)

This invention is concerned broadly with a method for alkylating arylmethyl methyl ketones and is more particularly concerned with a process for alkylation of phenylacetone and nuclearly substituted phenylacetones using an alkali hydroxide, selected from the class sodium hydroxide and potassium hydroxide as a condensing agent, in which the alkylation occurs on the methylene carbon atom.

Previous to this invention alkylation of mononuclear-arylmethyl methyl ketones has been accomplished by use of an alkyl halide in the presence of an alkoxide such as an isopropoxide or a tertiary butoxide. While it is possible to obtain satisfactory yields from this method of alkylation it does require the use of metallic sodium in the preparation of the alkoxide catalyst which catalyst is usually prepared in situ by dissolving metallic sodium in the anhydrous alcohol used as a solvent for the reaction.

It is known that sodium hydroxide acts as a condensing agent in the alkylation of arylmethyl aryl ketones. However, previous to this invention, the applicability of this condensing agent to the alkylation of arylmethyl methyl ketones was unknown. The absence of such report no doubt arises from the well known aldol condensation which arylmethyl methyl ketones undergo in the presence of a strong base such as sodium hydroxide and the fact that such compounds on heating in the presence of sodium hydroxide produce a large proportion of polymeric material. Thus, rather than acting as a condensing agent to cause alkylation, it would be expected that sodium or potassium hydroxide would cause polymerization.

Surprisingly, it has been discovered, as a feature of this invention, that, in the presence of an alkylating agent such as alkyl halides, sulfates, sulfonates and the like, arylmethyl methyl ketones are markedly more stable to the action of sodium hydroxide than in the absence of the alkylating agent so that polymerization is minimized. The sodium or potassium hydroxide acts as a condensing agent and alkylation of the arylmethyl methyl ketone occurs on the methylene carbon atom.

Thus, it is now possible to use the relatively cheap, easily handled condensing agent, sodium hydroxide, in the alkylation of arylmethyl methyl ketones rather than to use the heretofore known alkoxide catalysts which are markedly more expensive than sodium hydroxide and are more difficultly handled.

The process of this invention consists in admixing an arylmethyl methyl ketone and sodium hydroxide in approximately equimolar portions in a reaction vessel equipped for reflux, and adding thereto in small portions, preferably dropwise, an alkylating agent such as an alkyl halide, dialkyl sulfate, alkyl arylsulfonate and the like in at least a small molar excess. After the addition of the alkylating agent is concluded, the mixture is heated on a steam bath for a period of time up to approximately 24 hours after which it is cooled, water is added and the product extracted with ether. The ether solution is washed with water and dried over anhydrous sodium sulfate and the ether evaporated leaving the desired alkylated arylacetone which is then purified. Potassium hydroxide can be substituted for sodium hydroxide in the above reaction as condensing agent.

Further, it is possible to run the reaction in the presence of varying quantities of a solvent such as dioxane, methanol or ethanol. The solvent serves the dual purpose of facilitating the stirring of the reaction mixture and of providing more intimate contact of the reactants with the condensing agent. If a solvent is used, a small quantity is preferable, although alkylation proceeds smoothly when larger volumes are used.

Alkylation occurs when the entirety of the alkylating agent is admixed with the sodium hydroxide and arylmethyl methyl ketone and the reaction mixture heated for a period of time similar to that set forth above. However, it is preferred to add the alkylating agent to the mixture of catalyst and arylmethyl methyl ketone, since the reaction is thus more easily controlled.

The invention is illustrated by the following examples:

*Example 1.—Preparation of 3-phenyl-2-butanone.*—Powdered sodium hydroxide (90%) (146 g.; 3.3 moles) was placed in a two liter flask equipped with a mechanical stirrer, a reflux condenser, and a dropping funnel. Phenylacetone (402 g.; 3 moles) was added in one portion. The mixture was stirred vigorously and methyl iodide (470 g.; 3.3 mole) was added dropwise at such a rate that the temperature of the reaction mixture was maintained at 30–35°. After the addition was complete, stirring was continued for two hours during which time the temperature of the reaction mixture rose spontaneously to 40–45°. After this spontaneous reaction was over, the reaction mixture was heated on a steam bath for three and one-half hours. The light yellow mixture was cooled, sufficient water was added to dissolve the sodium iodide and the organic product was extracted with ether. After washing the ether solution with water and drying over sodium sulfate the solvent was evaporated. The residue was purified by distillation and the fraction boiling at 105–110° (22 mm.) was collected; $n_D^{25}$ 1.5117; yield 272 g. (62%).

*Example 2.—Preparation of 3-phenyl-2-hexanone.*—In an apparatus like that described in Example 1 there was placed powdered sodium hydroxide (90% pure) (61 g., 1.37 mole). To this was added with stirring, at a temperature below 45°, phenylacetone (167 g., 1.25 mole). Then n-propyl iodide (234.1 g., 1.37 mole) was added over a one hour period while the temperature was maintained at 40–45° by cooling as necessary. After the addition was complete, the reaction proceeded spontaneously at 40–45° for about two hours. The reaction mixture then was heated on a steam bath for four hours. The product was isolated as described in Example 1. The yield was 127 g. (58%); $n_D^{25}$ 1.5008; B. P. 123–125° (18–20 mm.).

*Example 3.—Preparation of 3-phenyl-5-hexene-2-one.*—In a 500 ml. round bottomed flask equipped with a reflux condenser, mechanical stirrer and dropping funnel was placed powdered sodium hydroxide (19.7 g.), phenylacetone (60 g., 0.448 mole) and absolute ethanol or methanol (10 ml.). Allyl bromide (60 g., 0.448 mole) was added slowly at a temperature of 40–50°. Sodium bromide precipitated and the color of the reaction mixture changed from dark orange to yellow. After the addition was complete and the spontaneous evolution of heat had ceased, the mixture was heated on a steam bath for four hours. The product was isolated in the usual manner. The yield was 64 g. (80%); $n_D^{20}$ 1.5164; B. P. 120–122° (16 mm.).

*Example 4.—Preparation of 3,4-diphenyl-2-butanone.*—Benzyl chloride (280 g.; 2.2 moles) was added dropwise with stirring at 40–45° over a period of 1¼ hours to a mixture of powdered sodium hydroxide (90%) (100 g.; 2.2 moles) and phenylacetone (268 g.; 2.0 moles) contained in a two liter round-bottomed flask equipped as in Example 1. After the addition was complete, the mixture was stirred for an additional 45 minutes and then was heated in a steam bath for 4 hours. The product was isolated in the manner described in Example 1 and there was obtained 285 g. (63.5%) of product; B. P. 128–130° (1 mm.); $n_D^{20}$ 1.5609.

*Example 5.—Preparation of 3-phenyl-2-heptanone.*—In the apparatus described in Example 1 there was placed powdered sodium hydroxide (2.0 moles) and absolute methanol (200 ml.). To this was added at 40–45° with stirring phenylacetone (2.0 mole). Then sodium iodide (2 g.) was added and n-butyl bromide (2.2 mole) was added dropwise with stirring. During the addition which occupied 1½ hours, the heat of the reaction was sufficient to maintain the temperature at 40–45°. The reaction mixture was stirred for an additional 2 hours and then heated on a steam bath for 8 hours. After the solvent had been evaporated the product was isolated as in Example 1. Yield 166 g. (44%); $n_D^{25}$ 1.4984; B. P. 131–138° (18.5 mm.).

*Example 6.—Preparation of 3-phenyl-2-butanone.*—Using the procedure outlined in Example 1 and replacing methyl iodide by dimethyl sulfate (1 mole/mole of phenylacetone) there is obtained 3-phenyl-2-butanone.

*Example 7.—Preparation of 3-phenyl-2-hexanone.*—By using the procedure outlined in Example 2 and replacing the condensing agent sodium hydroxide by an equimolar amount of potassium hydroxide there is obtained 3-phenyl-2-hexanone.

*Example 8.—Preparation of 3-phenyl-2-butanone.*—Using the procedure outlined in Example 1 and replacing the methyl iodide by methyl p-toluenesulfonate (1 mole/mole of phenylacetone) there is obtained 3-phenyl-2-butanone.

Similarly ethyl p-toluenesulfonate and n-propyl p-toluenesulfonate can be used instead of methyl p-toluenesulfonate to yield respectively 3-phenyl-2-pentanone and 3-phenyl-2-hexanone.

*Example 9.—Preparation of 3-p-tolyl-2-butanone.*—Using the procedure outlined in Example 1 and replacing the phenylacetone by an equimolar quantity of p-tolylacetone, there is obtained 3-p-tolyl-2-butanone.

*Example 10.—Preparation of 3-p-chlorophenyl-2-butanone.*—Using the procedure outlined in Example 1 and replacing the phenylacetone by an equimolar quantity of p-chlorophenylacetone, there is obtained 3-p-chlorophenyl-2-butanone.

*Example 11.—Preparation of 3-p-carboxyphenyl-2-butanone.*—Using the procedure outlined in Example 1 and replacing the phenylacetone by an equimolar quantity of p-carboxyphenylacetone and using twice the amount of hydroxide condensing agent, there is obtained 3-p-carboxyphenyl-2-butanone. The extra condensing agent is required as the carboxy portion of the ketone naturally will take up an equimolar quantity of alkaline hydroxide.

*Example 12.—Preparation of 3,4-diphenyl-2-butanone.*—Benzyl chloride (62 g.; 0.49 mole) was added dropwise over a one-half hour period to a stirred mixture of dioxane (75 ml.), powdered sodium hydroxide (19.7 g.; 0.49 mole) and phenylacetone (60 g.; 0.448 m.). The temperature of the reaction mixture was kept at 40–50° during the addition. The mixture then was heated, with stirring, on a steam bath for sixteen hours after which 50 ml. of dioxane was removed by distillation. Water was added to the amber residual mixture to dissolve the sodium chloride. The product was extracted with ether, the ether solution was washed with water and dried over sodium sulfate. After evaporation of the ether, the residue was distilled. There was obtained 52 g. (54%) of the desired product; B. P. 124–127° (1.0–1.5 mm.); $n_D^{20}$ 1.5626.

What is claimed is:

1. A process for the alkylation of arylmethyl methyl ketones comprising heating, without the addition of water, an arylmethyl methyl ketone with an alkylating agent chosen from the group consisting of alkyl halides, dialkyl sulfates, and alkyl arylsulfonates in the presence of an alkali hydroxide chosen from the group consisting of sodium hydroxide and potassium hydroxide.

2. A process for the alkylation of mononuclear-arylmethyl methyl ketones comprising heating, without the addition of water, a mononuclear-arylmethyl methyl ketone with an alkylating agent chosen from the group consisting of alkyl halides dialkyl sulfates, and alkyl arylsulfonates in the presence of an alkali hydroxide chosen from the group consisting of sodium hydroxide and potassium hydroxide.

3. A process for the alkylation of phenylacetone comprising heating, without the addition of water, phenylacetone with an alkylating agent chosen from the group consisting of alkyl halides, dialkyl sulfates, and alkyl arylsulfonates in the presence of an alkaline hydroxide chosen from the group consisting of sodium hydroxide and potassium hydroxide.

4. A process for the alkylation of arylmethyl methyl ketones comprising heating, without the addition of water, an arylmethyl methyl ketone with an alkylating agent chosen from the group consisting of alkyl halides, dialkyl sulfates, and alkyl arylsulfonates in the presence of sodium hydroxide.

5. A process for the alkylation of arylmethyl methyl ketones comprising heating, without the addition of water, an arylmethyl methyl ketone with an alkylating agent chosen from the group consisting of alkyl halides, dialkyl sulfates, and alkyl arylsulfonates in the presence of potassium hydroxide.

6. A process for the alkylation of arylmethyl methyl ketones comprising heating, without the addition of water, an arylmethyl methyl ketone with an alkyl halide in the presence of alkali hydroxide chosen from the group consisting of sodium hydroxide and potassium hydroxide.

7. A process for the alkylation of arylmethyl methyl ketones comprising heating, without the addition of water, an arylmethyl methyl ketone with a dialkyl sulfate in the presence of alkali hydroxide chosen from the group consisting of sodium hydroxide and potassium hydroxide.

8. A process for the alkylation of arylmethyl methyl ketones comprising heating, without the addition of water, an arylmethyl methyl ketone with an alkyl arylsulfonate in the presence of alkali hydroxide chosen from the group consisting of sodium hydroxide and potassium hydroxide.

FRANK S. CROSSLEY.

References Cited in the file of this patent

FOREIGN PATENTS

| Number | Country | Date |
|---|---|---|
| 50,014 | Netherlands | Mar. 15, 1941 |

OTHER REFERENCES

Fieser et al.: "Organic Chemistry," p. 128, Copyright 1944 by D. C. Heath and Co., Boston.

Suter et al.: J. Am. Chem. Soc., vol. 64, pp. 533–36 (1946).

Vavon et al.: Compt. rend., vol. 223, pp. 157–58 and 245–47 (1946).